United States Patent Office 2,818,414
Patented Dec. 31, 1957

2,818,414

PRODUCTION OF STEROID COMPOUNDS

Alan Gibson Long, Greenford, and John Selwyn Hunt, South Ruislip, England, assignors to G. N. R. D. Patent Holdings Limited, London, England, a British company No Drawing. Application May 9, 1955
Serial No. 507,146

19 Claims. (Cl. 260—397.45)

This invention is concerned with improvements in or relating to the preparation of compounds of the general formula

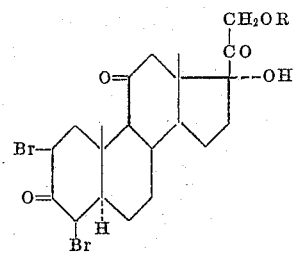

where R is an acyl group.

This application is a continuation-in-part of our application, Serial No. 428,804, filed May 10, 1954, now abandoned.

Rosenkranz, Mancera, Gatica and Djerassi (J. Amer. Chem. Soc., 1950, 72, 4077) have shown that compounds similar to the above can be converted into the corresponding 2-iodo-3-keto-$\Delta^4$-compounds by treatment with sodium iodide, and that the latter compounds can be reduced with chromous chloride and similar reagents to give 3-keto-$\Delta^4$-steroids. More recently Rosenkranz, Djerassi, Yashin and Pataki (Nature, 1951, 168, 28) have applied these reactions to convert 4:5-dihydroallocortisone-21-acetate to cortisone-21-acetate utilising a 2:4-dibromo intermediate. The preparation of such 2:4-dibromo compounds from 3-ketoallosteroids has been described in previous publications of Djerassi and his co-workers and will be dealt with more fully below. In view of the above mentioned process for the conversion of 2:4-dibromo-4:5-dihydroallocortisone-21-acetate into cortisone-21-acetate it will be apparent that the former compound is a valuable intermediate in the synthesis of cortisone and accordingly an improved process for its preparation will also be valuable in cortisone synthesis work.

Djerassi and his co-workers, in a series of publications, have shown that the reaction of a 3-ketoallosteroid with 2 molecular equivalents of bromine results in the formation of a 2:2-dibromo derivative, which rearranges under the influence of hydrogen bromide to give the 2:4-dibromo isomer see, for example, Djerassi and Scholz, J. Amer. Chem. Soc. 1947, 69, 2410 and Rosenkranz, Pataki, St. Kaufman, Berlin and Djerassi, J. Amer. Chem. Soc., 1950, 72, 4081. The procedure in all cases was to carry out the bromination in glacial acetic acid to which a small amount of hydrogen bromide was added, and, after the addition of the bromine, to allow the mixture to stand overnight, at room temperature, during which period the rearrangement of the 2:2-dibromo intermediate took place. In a publication describing the preparation of cortisone-21-acetate from 4:5-dihydroallocortisone-21-acetate by way of a 2:4-dibromo-intermediate (Rosenkranz, Djerassi, Yashin and Pataki, Nature, 1951, 168, 28) no yields are quoted for the preparation of the 2:4-dibromo intermediate, which was isolated in an impure state, or for the subsequent stages leading to cortisone-21-acetate, although later publications from the same authors indicated that the yield was unsatisfactory. Following exactly the methods of the above authors as described in the literature, we ourselves have only been able to obtain yields of 10–15% for the conversion of 4:5-dihydroallocortisone-21-acetate to cortisone-21-acetate.

In the synthesis of cortisone and its analogues from steroidal compounds of the allo series the characteristic double bond in the 4-position in ring A of the steroidal nucleus cannot be introduced by the methods previously adopted for compounds in the normal series (viz. monobromination at position 4 followed by dehydrohalogenation) as monobromination of a 3-ketoallosteroid leads to a 2-bromo compound. The reactions described by Djerassi et al. and referred to above therefore assume importance where cortisone and its analogues are to be synthesized from steroidal substances in the allo series; it is now well recognized that a group of naturally occurring steroids, namely certain sapogenins, are potentially important as starting materials for the synthesis of cortisone possessing as they do an oxygen function in ring C which can be converted to the characteristic 11-oxygen function of the adrenal cortical hormones, and substituents in ring D which can be converted into the dihydroxy acetone side chain of such hormones.

As stated above we have applied the process exactly as described by Djerassi et al. for the conversion of 4:5-dihydroallocortisone acetate to cortisone acetate and have only succeeded in achieving an overall yield of 10–15%, an observation which seems to accord with later publications of Djerassi and his co-workers. We then carried out an extensive programme of research intended to discover by what means the yield in such process could be improved and the process rendered economic from the commercial point of view.

Our researches indicated that in the series of reactions described by Djerassi, the preparation of the 2:2-dibromo compound appeared to take place in particularly poor yield and indeed, following Djerassi's procedures it was impossible to obtain a pure 2:4-dibromo intermediate.

The formation of this 2:4-dibromo compound involves first brominating the 4:5-dihydroallo cortisone ester to yield a 2:2-dibromo intermediate which rearranges in the presence of hydrogen bromide to yield the desired 2:4-dibromo compound. Normally upon bromination of the 3-keto-allosteroid with two molecular proportions of bromine, rearrangement of the 2:2-dibromo intermediate begins immediately, due to the hydrogen bromide produced during the bromination although it is possible, as will be described hereinafter, actually to isolate the 2:2-dibromo intermediate. Our researches have shown that in the particular case of 2:2-dibromo-4:5-dihydroallocortisone esters this rearrangement is an especially complicated reaction and that very strict control of certain conditions is essential if good yields are to be achieved. The rearrangement is not an ordinary acid-catalysed rearrangement and hydrogen bromide is the only catalyst which will bring it about. The reaction involves removal of one of the bromine atoms from position 2 and its re-insertion at position 4 and this may indeed be regarded as a true bromination, or rather rebromination. Our researches have indicated that in the particular case of the rearrangement of 2:2-dibromoallocortisone esters there are a number of competing reactions which take place during the rearrangement, involving for example, bromination at position 9, acetylation at position 17 (although this latter was contrary to expectation) and so forth. We therefore set out to determine what conditions would actually favour the formation of the desired 2:4-dibromo compound.

It has hitherto been the practice to carry the rearrangement of 2:2-dibromo-3-ketoallosteroids for relatively long periods of time since generally the longer this time of reaction the greater becomes the yield of desired 2:4-dibromo compound. However in the particular molecular arrangement present in 2:2-dibromo-4:5-dihydroallocortisone esters, it has surprisingly appeared that for the obtaining of good yields time is a highly important and critical factor. Thus we have discovered that greatly improved yields are obtained if the time of this re-arrangement is kept within the range of from 3-180 minutes, as contrasted with the periods of 16-20 hours commonly employed hitherto. This time range of from 3 to 180 minutes is highly critical and if the reaction is allowed to continue beyond the stated time, a considerable fall-off in yield quickly takes place. The lower limit of the range, i. e. 3 minutes represents the minimum time which, we have found to be necessary for a substantial quantity of 2:4-dibromo compound to be formed. Within the stated time range we have found that particularly excellent results are obtained if the time of reaction is kept within the range 3-45 minutes and that even after 45 minutes and before 180 minutes some fall off of yield occurs.

A second critical factor is the concentration of hydrogen bromide present during the rearrangement; hitherto only a small quantity has been added to the reaction, it being generally thought that the quantity produced during the initial bromination was almost in itself sufficient. Our researches have however proved firstly, that it is not the quantity of hydrogen bromide which is important but the concentration present in the medium, and secondly, that this concentration should be within certain critical limits; it is in fact the case that the concentration of hydrogen bromide should be rather higher than used heretofore as with increased hydrogen bromide concentration the speed of the desired re-arrangement increases without the speed of some of the side reaction being increased, thus securing a larger yield of the desired compound. The critical limits for the hydrogen bromide concentration have after many experiments been shown to be the limits of the range 0.1–5 N; it has been found particularly advantageous to operate at concentrations within the range of from 0.5–1.5 N.

It is here necessary to point out that the concentration of hydrogen bromide as referred to in the present specification and claims includes both hydrogen bromide which may be produced in situ by the initial bromination as well as a hydrogen bromide added to the reaction medium.

A third important discovery which our researches have shown, is that when dibrominating a 4:5-dihydroallocortisone ester and directly rearranging, without isolation, the 2:2-dibromo intermediate, increased yields are obtained by operating in relatively small reaction volumes wherein the steroid starting material is present as a suspension rather than in solution; by this procedure the tendency for bromination to take place at the 9-position appears to be suppressed.

By applying the critical conditions which are the subject of this invention we have been able not only to increase the yield of dibromo compound up to 72%, but have also been able consistently to obtain this compound in pure form, following crystallisation from a suitable solvent, as for example ethyl acetate/n-hexane. The ability, for the first time, to be able to purify the 2:4-dibromo compound assist considerably in the obtaining of good yields and pure products in the succeeding stages. When operating our improved process we find that an appreciable amount of the starting 4:5-dihydro compound can be recovered from the mother liquors by reduction, for example with chromous chloride, which has enabled us to raise the overall yield up to 82%.

According to the present invention therefore we provide a process for the production of compounds of the general formula

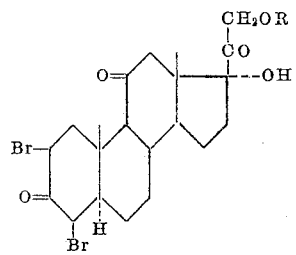

(where R is an acyl group) which comprises treating the corresponding 2:2-dibromo-isomer with hydrogen bromide in the presence of an inert organic solvent and quenching the reaction after a reaction period of from 3 to 180 minutes.

The 2:2-dibromo isomers may be made by the action of 2 mols of bromine upon a 21-ester of 4:5-dihydroallocortisone and since hydrogen bromide is released during this bromination the 2:2-dibromo compound will normally be isomerised in situ. The 2:2-dibromo intermediate may however be isolated by first brominating the 4:5-dihydroallocortisone ester with one molecular proportion of bromine, and then brominating the resultant 2-monobromo compound with a further molecular proportion of bromine, under basic conditions, for example in the presence of potassium acetate (see Example 5 hereafter). Where the process of the invention is carried out by brominating the 4:5-dihydroallocortisone ester under non-basic conditions the time for the rearrangement counts from the first addition of bromine. In such cases, as stated above, it is also highly desirable to add additional hydrogen bromide as that produced by the bromination stage is not sufficient for really efficient and rapid rearrangement.

According to a feature of the present invention, therefore, we provide a process for the preparation of compounds of the specified general formula where R is an acyl group, by bromination of 21-esters of 4:5-dihydroallocortisone with approximately 1.9–2.3 molecular equivalents of bromine in the presence of an inert organic solvent and rearrangement of the formed 2:2-dibromo compounds in which the reaction is quenched within approximately 3–180 minutes of the first addition of the bromine.

According to a further feature of the invention the rearrangement of the 2:2-dibromo intermediate is effected by treatment with hydrogen bromide at a concentration of from 0.1–5 N, preferably from 0.5 to 1 N.

According to yet another feature of the invention the bromination is carried out with a suspension of the starting material in the inert organic solvent.

The inert organic solvent may be an aliphatic carboxylic acid containing from 1-4 carbon atoms, for example, acetic acid or a mixture of more than one such acid, with or without the addition of a chlorinated hydrocarbon, for example chloroform.

Halogenated hydrocarbons, such as chloroform and methylene chloride may also be used as solvents and may advantageously be used admixed with other solvents. Thus, for example, methylene chloride containing 10% of diethyl ether or 2% of ethanol is an advantageous solvent. It is not possible to give general rules governing the exact choice of solvent and the suitability of any particular solvent or solvent mixture can only be determined by preliminary experiment. The moisture content of the medium should not exceed 0.5%.

The bromination may be effected in homogeneous solution but preferably, as stated above by using a suspension of the steroid starting material in finely divided form. It may be noted that it was not previously known that suspensions could be used in such reactions.

The preferred embodiment of the invention namely the simultaneous bromination and re-arrangement may be carried out at temperatures from −20° to +50° C., and we prefer to use temperatures of 15–35° C. It will, of course, be appreciated that the lower limit of temperature will vary according to the nature of the solvent since some of those specified solidify at temperatures higher than −20° C.

As stated above the rearrangement should be completed within approximately 3–180 minutes which, in a combined bromination and rearrangement will count from the addition of bromine. The lower limit of time corresponds to the upper limit of temperature. We find that the optimal time varies according to the temperature at which the reaction is conducted, the solvent used and the amount of hydrogen bromide added. Accordingly the optimal time for which the reaction mixture should be allowed to stand after the completion of the addition of the bromine should be determined by preliminary test with any given set of circumstances. We find, for example, that using the preferred temperature range of 15–35° C., the optimal time will be between 3 and 45 minutes. At the end of this time the reaction should be quenched, for example by pouring the reaction mixture into a large volume of water.

In the combined bromination and rearrangement process between 1.9 and 2.3 molecular equivalents of bromine should be used in the process, preferably 2.1 molecular equivalents.

The bromine should be added as rapidly as possible, care being taken that a large excess of unreacted bromine is never present, and that the temperature does not rise above the prescribed limits. Hydrogen bromide to give the desired concentration is of course added prior to the addition of bromine.

Where an aliphatic acid is used as solvent, the rate of addition of bromine may, for example, be controlled by adding portions thereof stepwise and waiting for the colour to discharge after each addition before the next addition. Where a halogenated hydrocarbon is used as solvent the bromination step is too rapid for this method of control to be used and the most satisfactory rate can only be determined by experiment. For comparatively small scale experiments it is generally convenient to add the bromine over 10–15 minutes. Convenient methods of operating will be seen from the examples which follow.

The acyl radical which is used to protect the hydroxy group at the 21-position is preferably an acetyl radical. As will be obvious to those skilled in the art other acyl radicals may also be used, the function thereof being purely to protect the hydroxy group during the reaction. Acyl groups of aliphatic acid containing up to eight carbon atoms are preferable such as acetyl, propionyl, butyryl, caprylyl and caproyl radicals along with substituted aliphatic radicals such as phenylacetyl, chloracetyl etc. Acyl radicals derived from aromatic acids, such as benzoyl, toluyl naphthoyl etc. radicals can also be used but not so conveniently. The acyl radical at the 21-position in this specification and claims is therefore to be taken to be a protective acyl radical. The employment of an acyl radical to protect a hydroxy group is a very common expedient in organic chemistry and suitable radicals for this purpose are very well known to those skilled in the art.

In order that the invention may be well understood, the following examples are given by way of illustration only:

EXAMPLE 1

To a finely divided suspension of 21-acetoxy-17α-hydroxy-3:11:20-triketoallopregnane (80 g.) in acetic acid (900 ml., moisture 0.1%) was added a 5.6 N solution of hydrogen bromide in acetic acid (70 ml., 2 mol. equivalents, moisture 0.1%). The suspension was stirred vigorously while a solution of bromine (64.8 g., 2.05 mol. equivalents) in acetic acid (200 ml.) was added over three and a quarter minutes and the reaction mixture was cooled to approximately 16° during this procedure by means of an ice-water bath. When all the bromine had been added the surrounding ice and water was removed and the solution was stirred for a further six minutes. It was poured into water (3 l.) and extracted with methylene chloride. The methylene chloride extracts were separated, washed with water, 0.25 N sodium bicarbonate solution, again with water and dehydrated over anhydrous magnesium sulphate. The solution was evaporated to a small bulk under reduced pressure, ethyl acetate (250 ml.) added and the distillation continued. The residue (120 g.) was added to a boiling mixture of ethyl acetate (50 ml.) and cyclohexane (60 ml.). On heating and stirring, 21 - acetoxy - 2:4 - dibromo - 17α - hydroxy - 3:11:20 - triketoallopregnane was precipitated. The mixture was cooled to room temperature, diluted with benzene (80 ml.), the dibromo compound collected, washed twice with benzene and finally with n-hexane, yielding 72.3 g. (65%); M. P. 172–4° (dec.) $[\alpha]_D^{20}+81°$ (c. 1.04 chloroform) (Found: Br. 28.0%. $C_{23}H_{30}O_6Br_2$ required Br. 28.4%).

EXAMPLE 2

Finely divided 21-acetoxy-17α-hydroxy-3:11:20-triketoallopregnane (5 g.) was suspended in a mixture of acetic acid (56 ml., moisture 0.1%) and dry alcohol-free chloroform (14 ml.) which had been cooled to 0°. A 4.2 N solution of hydrogen bromide in acetic acid (6 ml., 2 mol. equivalent) was added, followed, with stirring, by the addition of a solution of bromine (4 g., 2 mol. equivalents) added dropwise over 27 minutes. The solution was allowed to stand at 0° for a further 70 minutes, when it was diluted with water and extracted with chloroform. The organic layer was separated washed with water until neutral, dehydrated over anhydrous magnesium sulphate and the chloroform distilled under reduced pressure. The residue was added to hot ethyl acetate (4 ml.) and stirred until the dibromo compound had separated. The product was collected and washed with benzene and n-hexane giving 21-acetoxy-2:4-dibromo-17α-hydroxy-3:11:20-triketoallopregnane (3.3 g., 47.5%); M. P. 174–6° (dec.); $[\alpha]_D+81°$ (chloroform).

EXAMPLE 3

A finely divided suspension of 21-acetoxy-17α-hydroxy-3:11:20-triketoallopregnane (5 g.) in a mixture of acetic acid (60 ml., moisture 0.1%) and dry alcohol-free chloroform (65 ml.) was cooled to −12° and treated with a 4.2 N solution of hydrogen bromide in acetic acid (12 ml., 4 mol. equivalents), while the suspension was stirred, a solution of bromine (4 g., 2 mol. equivalents) in acetic acid (14 ml.) was added over 15 minutes. The solution was allowed to stand at −12° for a further 60 minutes after which it was allowed to warm up to room temperature over a period of 100 minutes. Water was then added and the chloroform layer separated, washed with water until neutral and dehydrated over anhydrous magnesium sulphate. The solvent was removed under reduced pressure and the residue stirred with hot ethyl acetate (4 ml.) when the dibromo compound separated. The product was collected, washed with benzene and n-hexane giving 21-acetoxy - 2:4 - dibromo - 17α - hydroxy - 3:11:20 - triketoallopregnane (2.4 g., 34.4%), M. P . 175–6° (dec.) $[\alpha]_D+78.5°$ (chloroform).

EXAMPLE 4

A finely divided suspension of 21-acetoxy-17α-hydroxy-3:11:20-triketoallopregnane (20 g.) in a mixture of acetic acid (70 ml.) and formic acid (120 ml. 98–100% grade, dehydrated by the addition of acetic anhydride) was treated with a 5.6 N solution of hydrogen bromide in acetic acid (9 ml. 1 mol. equivalent), followed by a solution of bromine (16.2 g., 2.05 mol. equivalents) in acetic acid (50 ml.). The bromine solution was added over 2 minutes while the reaction mixture was vigorously stirred, and after stirring for a further 5 minutes the solution was poured into water (1200 ml.) and extracted with methylene chloride. The extract was washed with water, dilute sodium bicarbonate solution, again with water and dehydrated over anhydrous magnesium sulphate. The solvent was evaporated under reduced pressure and the residue was added with stirring to a boiling mixture of ethyl acetate (15 ml.) and cyclohexane (18 ml.) which caused the separation of the dibromo compound. After cooling to room temperature, the mixture was diluted with benzene and the product collected, washed twice with benzene and finally with n-hexane giving 21-acetoxy-2:4-dibromo-17α-hydroxy-3:11:20-triketoallopregnane (14 g., 50.5%), M. P. 166–7° (dec.), $[\alpha]_D+93°$ (chloroform).

EXAMPLE 5

*Preparation of 21 - acetoxy - 2:2 - dibromo - 17α - hydroxy-3:11:20-triketoallopregnane*

21 - acetoxy - 2 - bromo - 17α - hydroxy - 3:11:20-triketoallopregnane (10 g.) was dissolved in 0.5 N potassium acetate in acetic acid (600 ml.; moisture<0.1%) at 80°, and a solution of bromine (1.25 ml.; 1.15 moles) in 0.5 N potassium acetate in acetic acid (100 ml.) was added as fast as the halogen was taken up. The addition took about 15 mins., after which the solution was poured into brine (6.1). The white precipitate was filtered off, washed with 10% acetic acid solution and dried over $P_2O_5$. In this way a crude dibromo compound (10 g.), $[\alpha]_D+135°$ (chloroform), was obtained, which was crystallised from ethyl acetate-n-hexane as needles (4.25 g.: 36% yield) of 21-acetoxy-2:2-dibromo-17α-hydroxy-3:11:20-triketoallopregnane, M. P. 160–4° (decomp.) $[\alpha]_D^{20}$ (chloroform). Found: Br, 28.3%. $C_{23}H_{30}O_6Br_2$ requires Br, 28.4%.

EXAMPLE 6

*21 - acetoxy - 2:4 - dibromo - 17α - hydroxy - 3:11:20-triketoallo-pregnane*

21 - acetoxy - 2:2 - dibromo - 17α - hydroxy-3:11:20-triketoallopregnane (3.35 g.) was suspended in acetic acid (100 ml. moisture 0.1%) and to the suspension was added a 3.4 N solution of hydrogen bromide in acetic acid (6.7 ml.). After 10 minutes the solid had passed into solution, and the further course of the reaction was followed in a polarimeter tube. At 10 minutes the specific rotation was +80.5° and at 15 minutes it had dropped to +78° when it remained constant. After 20 minutes the solution was diluted with brine (4 l.) and the precipitated material was collected, washed with water and dried in vacuo over phosphorous pentoxide. The crude product (3.05 g.) was dissolved in benzene (50 ml.) and to the heated solution n-hexane (40 ml.) was added, which caused the precipitation of a gummy solid. The mixture was allowed to cool to 0°, after which the supernatant liquor was decanted and the solid dissolved in benzene (10 ml.); this solution was heated and stirred when 21-acetoxy - 2:4 - dibromo - 17α - hydroxy - 3:11:20 - triketoallopregnane separated. The product was collected, washed with benzene and finally with n-hexane giving 1.62 g. (48.5%) M. P. 172.4° (dec.), $[\alpha]_D+91.5$ (chloroform). Recrystallisation from ethyl acetate (30 ml.)-n-hexane (68 ml.) gave colourless needles (1.16 g.) M. P. 172–3° (dec.), $[\alpha]_D+87°$ (CHCl₃, c., 1.01%). (Found Br, 27.5%. $C_{23}H_{30}O_6Br_2$ required Br, 28.4%.)

EXAMPLE 7

*Bromination of dihydroallocortisone acetate in chloroform and methylene chloride*

(a) *In chloroform.*—A solution of bromine in dry chloroform (1.02 N; 16.0 ml.; 1.1 mol.) was added in one portion with stirring to a solution of dihydroallocortisone acetate (3 g.) in dry chloroform (87 ml.) containing hydrogen bromide (1 mol.). A further solution of bromine (1.02 N; 16.0 ml.; 1.1 mol.) was added with stirring over ½ hour. Water (200 ml.) was immediately added, the organic layer washed with saturated aqueous sodium bicarbonate (100 ml.) and water (100 ml.), and the solvent evaporated at room temperature to yield a glass. $[\alpha]_D+72$ (c., 1.0 in CHCl₃). Br, 28.0%. The I. R. spectrum indicated that the glass contained a high proportion of 2:4-dibromodihydroallocortisone acetate.

(b) *In methylene chloride.*—A solution of bromine in dry methylene chloride (1.02 N; 16.0 ml.; 1.1 mol.) was added in one portion with stirring to a solution of dihydroallocortisone acetate (3 g.) in dry methylene chloride (87 ml.) containing hydrogen bromide (1 mol.). A further solution of bromine (1.02 N; 16.0 ml.; 1.1 mol.) was added with stirring over ½ hour. The product was isolated as in (a) above. A glass was obtained and this was dissolved in a boiling mixture of cyclohexane (3 ml.) and ethyl acetate (3 g.) after cooling and adding benzene (3 ml.) 2:4-dibromodihydroallocortisone acetate slowly separated. The solid was collected and washed with benzene (3 ml.) 2:4-dibromodihydroallocortisone acetate slowly separated. The solid was collected and washed with benzene (3 ml.) and ether (3 ml.). Wt. 0.98 g.; $[\alpha]_D+85$ (c., 1.0 in CHCl₃), M. P. 175° (decomp.) Br, 28.0%.

(c) *In methylene chloride containing ethyl ether.*—A solution of bromine in dry methylene chloride (1.05 N; 32.5 ml.; 2.3 mol.) was added over 15 minutes with stirring to a solution of dihydroallocortisone acetate (3 g.) in a mixture of methylene chloride (75 ml.) and ethyl ether (12 ml.) containing hydrogen bromide (1 mol.). 2:4-dibromodihydroallocortisone acetate was isolated and crystallised as in (b) above. Wt. of solid 1.26 g.; $[\alpha]_D+86$ (c., 1.0 in CHCl₃), M. P. 173° (decomp.). Br, 28.8%.

(d) *In methylene chloride containing ethyl alcohol.*—A solution of bromine in dry methylene chloride (1.02 N; 16.0 ml.; 1.1 mol.) was added in one portion with stirring to a solution of dihydroallocortisone acetate (3 g.) in dry methylene chloride (87 ml.) containing dry ethyl alcohol (2.4 ml.) and hydrogen bromide (1 mol.). A further solution of bromine (1.02 N; 16.0 ml.; 1.1 mol.) was added with stirring over ½ hour. The product was isolated as in (a) above. A glass was obtained, $[\alpha]_D+65$ (c., 1.0 in CHCl₃). Br, 28.0%. The I. R. spectrum indicated that the glass contained a high proportion of 2:4-dibromodihydroallocortisone acetate.

EXAMPLE 8

A finely divided suspension of 21-acetoxy-17α-hydroxy-3:11:20-triketoallopregnane (250 g.) in a mixture of glacial acetic acid (2.11 l.) and 4.6 N hydrogen bromide in acetic acid (270 mls.) was cooled to 17° C. and a solution of bromine (65 mls.) in acetic acid (500 mls.) added with vigorous stirring over a period of 11 mins. The temperature rose to 24° C. When addition was complete the mixture was allowed to stand for a further 15 mins. before being poured into water (7.5 l.). The aqueous suspension was extracted with methylene chloride (1 x 1.5 l.; 1 x 1 l.; 1 x 250 mls.) and the combined extracts washed with water (2 l.), saturated sodium bicarbonate solution (2 l.), and again with water (2 l.). These washes were successively re-extracted with methylene chloride (500 mls.) and the combined organic extracts evaporated to dryness under reduced pressure. The solidified gum so obtained still contained methylene chloride, but was suitable for the next stage. A small sample of the crude dibromide had $(\alpha)_D+70.5°$ (CHCl₃) on drying.

A solution of iodo acetone was prepared by refluxing a mixture of sodium iodide (1.75 kg.) in acetone (4.5 l.) with a solution of bromacetone, made by the reaction of bromine (67 mls.) with acetone (1.88 l.). The crude dibromide dissolved in acetone (1.5 l.) was added, the mixture refluxed for 2.5 hrs., and the reaction completed by the addition of anhydrous oxalic acid (245 g.) followed by boiling for a further hour. Ethyl acetate (5 l.) was added followed by saturated aqueous sodium bicarbonate (300 g.) and then a mixture of sodium bicarbonate (630 g.) and sodium metabisulphite (240 g.), in aqueous solution (7.5 l.). The aqueous layer was re-extracted with ethyl acetate (2 x 2 1.) and the combined extracts washed with water (2 x 4 1.). The aqueous washes were successively re-extracted with ethyl acetate (1 1.), and the combined organic layers evaporated to dryness. The residual solid was dissolved in I. M. S. (3.75 1.) containing Girard reagent "P" (125 g.) and glacial acetic acid (187 mls.), the solution refluxed for 30 mins. and then cooled to 20° C. Formalin (500 mls.) was added all at once, and the mixture after standing for 25 mins. at 20° C., was poured into 4% aqueous sodium bicarbonate (9.5 1.) and ethyl acetate (3.75 1.), the aqueous phase was extracted with ethyl acetate (2 x 2 1.), and the combined ethyl acetate layers washed with 4% aqueous sodium bicarbonate solution (2 1.) and water (2 x 1.25 1.), the washes being successively re-extracted with ethyl acetate (1 1.).

The combined aqueous solutions were acidified to pH 1 with concentrated hydrochloric acid in the presence of ethyl acetate (3.75 1.). After standing for 1 hour the layers were separated and the aqueous phase extracted with ethyl acetate (2 x 2 1.), the combined extracts being washed with saturated sodium bicarbonate solution and water (1 x 2 1.).

The ethyl acetate solution was allowed to stand overnight in the presence of sodium sulphate and activated charcoal, filtered, and taken down to a thick slurry. Ether was added and the solid filtered and dried. This was cortisone acetate. $(\alpha)_D = +219°$ (c.=1% in CHCl$_3$, M. P. 237–240° C., U. V. max. at 238 m$\mu$ $$E_1^1 = 374$$

Yield=105 g. (ca. 42% of theory).

EXAMPLE 9

Finely divided 21-acetoxy-17α-hydroxy-3:11:20-triketo-allopregnane (250 g.) was suspended in a mixture of glacial acetic acid (2.75 1.) and 4 N hydrogen bromide in acetic acid (310 mls.) and cooled to 17° C. Bromine (66 mls.) in acetic acid (2 1.) was added over a period of 10 minutes with vigorous stirring, and the reaction completed by allowing the mixture to stand for a further 15 minutes. The crude 21-acetoxy-2:4-dibromo-17α-hydroxy-3:11:20-triketoallopregnane was isolated as described in the above example. $(\alpha)_D = 71.4°$ (c.=1% CHCl$_3$).

When treated as described in Example 8 this material gave rise to cortisone acetate $(\alpha)_D = +220°$ (c.=1% CHCl$_3$), M. P. 236–238° C., U. V. max. at 238 m$\mu$ $$E_1^1 = 375$$

Yield=107 g. (ca. 43% of theory).

What we claim is:

1. A process for the preparation of compounds of the general formula

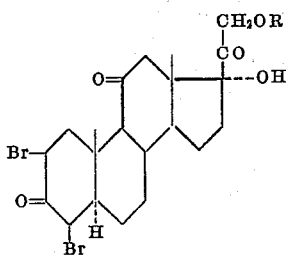

where R is an acyl group derived from an organic carboxylic acid which comprises treating the corresponding 2:2-dibromo compound in the presence of an organic solvent with hydrogen bromide at a concentration of from 0.1–5 N to effect rearrangement to the 2:4-dibromo isomer and quenching the reaction after a reaction time falling within the range of from 3 to 180 minutes.

2. A process for the preparation of compounds of the general formula

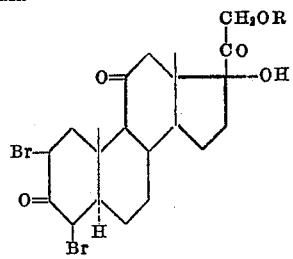

where R is an acyl group of an aliphatic acid containing up to eight carbon atoms, comprising treating the corresponding 2:2-dibromo isomer with hydrogen bromide at a concentration of from 0.1–5 N at a temperature of —20 to +50° C. in the presence of an inert solvent to effect rearrangement to the 2:4-dibromo isomer and quenching after a time of reaction falling within the range of from approximately 3 to 180 minutes.

3. The process defined in claim 2 in which said quenching is effected by adding a substantial volume of water to the reaction.

4. The process defined in claim 2 in which the temperature of reaction is within the range of 15–35° C. and the time of reaction is within the range of from 3–45 minutes.

5. A process for the preparation of compounds of the general formula

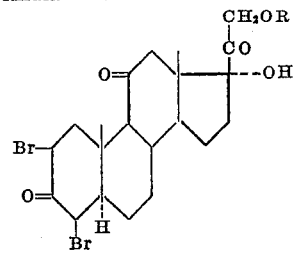

where R is an acyl group derived from an organic carboxylic acid, comprising treating the corresponding 2:2-dibromo isomer in the presence of an organic solvent with hydrogen bromide at a concentration of from 0.5–1.5 N at a temperature of from 15–35° C. to effect rearrangement to the 2:4-dibromo isomer and quenching after a time of reaction falling within the range of from approximately 3–45 minutes.

6. The process defined in claim 5 in which R is an acetyl group.

7. A process for the production of compounds of the formula

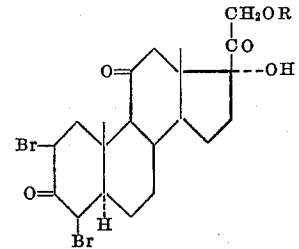

where R is an acyl group derived from an organic carboxylic acid which comprises reacting a compound of the general formula

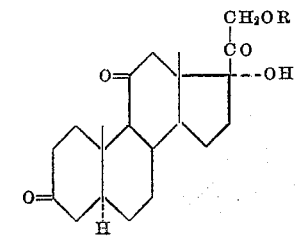

with approximately 1.9–2.3 molecular equivalents of bromine in the presence of hydrogen bromide at a concentration of from 0.1–5 N at a temperature within the range of from —20 to +50° C. and quenching the reaction at a time within the range of from 3 to 180 minutes of the first addition of bromine.

8. The process defined in claim 7 in which the quenching is effected by adding a substantial volume of water to the reaction medium.

9. A process for the preparation of compounds of the formula

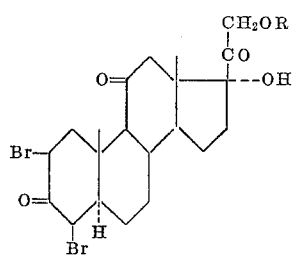

where R is an acyl group derived from an organic carboxylic acid which comprises rapidly adding to a solution of a compound of the general formula

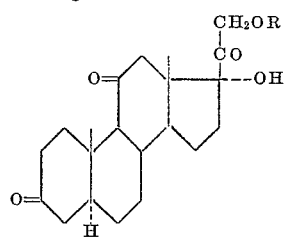

in an inert organic solvent from 1.9–2.3 molecular equivalents of bromine while avoiding a substantial excess of bromine in the presence of hydrogen bromide at a concentration of 0.1–5 N at a temperature of —20 to +50° C. and quenching by adding water to the reaction medium after a time within the range of from 3–15 minutes.

10. The process defined in claim 9 in which the temperature of the reaction is within the range of from 15–35° C. the concentration of hydrogen bromide is within the range of from 0.5–1.5 N and the reaction is quenched at a time within the range of from 3–45 minutes from the first addition of bromine.

11. The process defined in claim 9 in which R is an acetyl group.

12. A process for the preparation of compounds of the formula

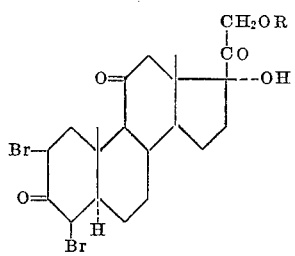

where R is an acyl group derived from an organic carboxylic acid which comprises treating a compound of the formula

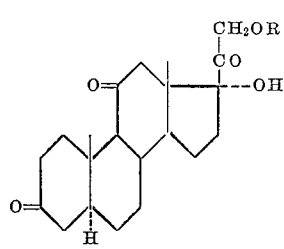

in suspension in an inert organic solvent with from 1.9–2.3 molecular equivalents of bromine in the presence of hydrogen bromine at a concentration of from 0.1–5 N and quenching the reaction at a time within the range of from 3 to 180 minutes of the first addition of bromine.

13. The process defined in claim 12 in which the solvent is selected from the group consisting of acetic acid, chloroform and methylene chloride.

14. The process defined in claim 12 in which the reaction is carried out at temperatures in the range of from 15–35° C. the concentration of hydrogen bromide within the range of from 0.5–5 N and quenching takes place at a time within the range of from 3–45 minutes from the first addition of bromine.

15. The process defined in claim 12 in which the starting material is 4:5-dihydroallocortisone-21-acetate.

16. A process for the preparation of the compounds of the general formula

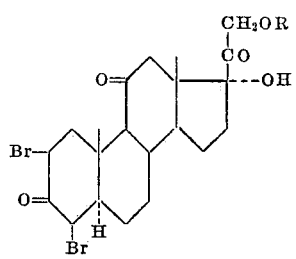

where R is an acyl group of an aliphatic acid containing up to eight carbon atoms which comprises reacting a compound of the formula

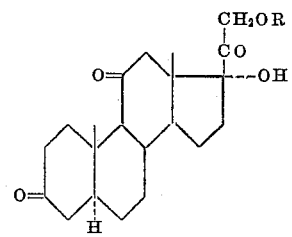

with from 1.9–2.3 molecular equivalents of bromine in the presence of an organic solvent and in the presence of hydrogen bromide at a concentration of from 0.1 to 5 N at a temperature within the range of from —20 to +50° C., quenching the reaction at a time within the range of from 3 to 180 minutes from the first addition of bromine, isolating the resulting 2:4-dibromo compound and recovering separately the residual starting compound.

17. A process for the preparation of compounds of the general formula

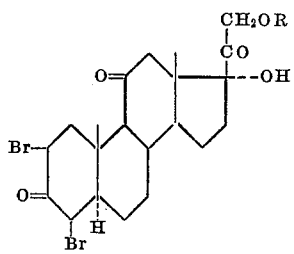

where R is an acyl group derived from an organic carboxylic acid which comprises brominating a compound of the general formula

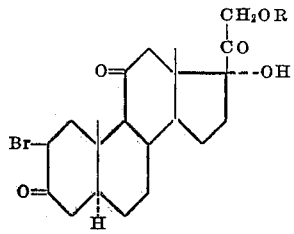

with approximately one molecular proportion of bromine in the presence of an inert organic solvent in the presence of a basic acid binding agent isolating the resultant 2:2-dibromo compound and treating said 2:2-dibromo compound in the presence of an inert organic solvent with hydrogen bromide at a concentration of from 0.1 to 5 N at a temperature of from −20 to +50° C. to effect rearrangement to the corresponding 2:4-dibromo isomer and quenching the reaction after a reaction time of from 3 to 180 minutes.

18. A process as claimed in claim 17 in which said acid binding agent is potassium acetate.

19. A process as claimed in claim 17 in which the concentration of hydrogen bromide is within the range of from 0.5–1.5 N, the temperature is within the range of from 15–35° C. and the rearrangement reaction is quenched after a reaction period within the range of from 3–45 minutes.

References Cited in the file of this patent
UNITED STATES PATENTS 2,703,805 Rosenkranz _____ Mar. 8, 1955
2,705,237 Djerassi _____ Mar. 29, 1955